United States Patent [19]

Krause et al.

[11] 4,086,670
[45] May 2, 1978

[54] AIRCRAFT TOILET DRAIN ASSEMBLY

[75] Inventors: John D. Krause, Westminister; Eugene F. Colditz, Huntington Beach, both of Calif.

[73] Assignee: Kaiser Aerospace & Electronics Corporation, Irvine, Calif.

[21] Appl. No.: 747,736

[22] Filed: Dec. 6, 1976

[51] Int. Cl.$^2$ .............................................. A47K 1/14
[52] U.S. Cl. ........................................ 4/295; 138/89; 292/DIG. 65
[58] Field of Search ....................... 292/252, DIG. 65; 49/31; 138/89–95; 222/544–563, 153, 41; 4/1, 8, 295; 141/46

[56] References Cited

U.S. PATENT DOCUMENTS 2,742,105  4/1956  Dow ............................ 292/DIG. 65

Primary Examiner—Houston S. Bell

[57] ABSTRACT

This invention relates to an aircraft toilet drain assembly of the type utilizing a drain plug, intended to prevent a maintenance operator from failing to replace the drain plug at the completion of after-flight servicing. The assembly is installed at the end of an outlet tube from a toilet holding tank in a position adjacent an access opening in the aircraft, which is closed in flight by an access panel. The assembly includes an outlet nipple, secured to the outlet tube, and a releasable cover mountable on the end of the nipple. A handle mounted on the cover is selectively movable between an extended position in which it obstructs the access opening to prevent the access panel from being closed and a depressed condition in which the access panel can be closed. An interlock responsive to the presence of the drain plug in the nipple locks the handle in its extended position unless a drain plug is present. The toilet drain assembly thus ensures that the aircraft access panel cannot be closed and the aircraft cleared for flight, unless a drain plug has been installed.

24 Claims, 5 Drawing Figures

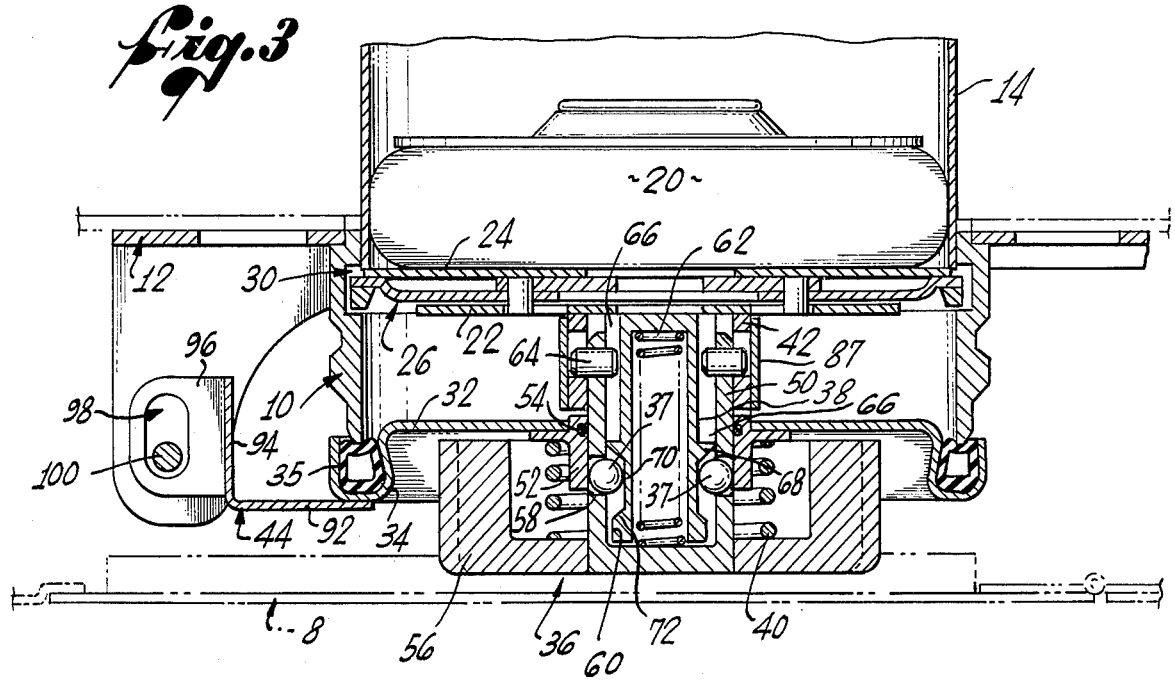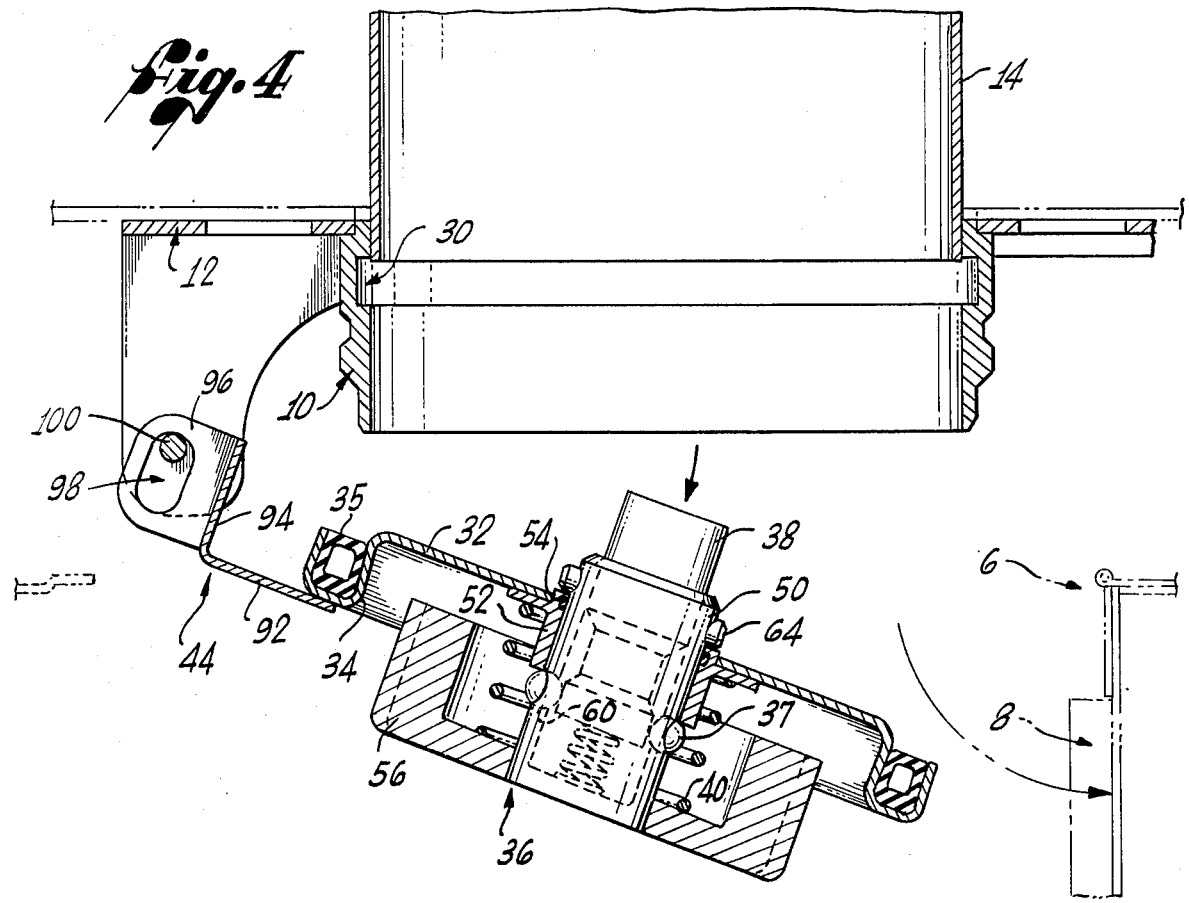

AIRCRAFT TOILET DRAIN ASSEMBLY

BACKGROUND OF THE INVENTION

This invention relates to an aircraft toilet drain assembly for use with toilet systems of the type including a holding tank for storing toilet waste and a waste valve for releasing the waste down an outlet tube, wherein a removable drain plug is installed in the outlet tube to trap any leakage of the tank contents past the waste valve which may occur during flight.

In the operation of passenger aircraft provided with flush toilet facilities, it is common to store the waste toilet products in a toilet holding tank during flight with the tank being emptied during subsequent after-flight servicing. The aircraft holding tank is customarily provided with an outlet tube which terminates in a drain nipple mounted adjacent an access opening in the aircraft fuselage, the access opening being covered by an access panel which is closed during flight. Emptying of the contents of the holding tank through the outlet tube is controlled by a waste valve mounted in the tank at the junction to the outlet tube. Because the waste valve may sometimes permit some leakage of the contents of the tank into the outlet tube during flight it has become conventional practice to install an expandable drain plug at the down stream end of the outlet tube to trap any such leakage. A cover is usually secured to the end of the nipple, downstream of the drain plug. During after flight servicing, the operator of a ground cart for emptying the aircraft toilets will remove the cover and connect one leg of a Y drain coupling tool to the drain nipple and engage the drain plug with a setting tool which can be manipulated to release the drain plug from its expanded condition and withdraw the plug from the nipple. After that, the waste valve is opened permitting the tank contents to flow out through a second leg of the Y-drain coupling, which branches from the first leg and directs the contents into the ground cart. Such a system is disclosed in U.S. Pat. No. 3,010,694 to William B. Lynch, assigned to the same assignee as the present application. In addition, reference may also be made to co-pending application Ser. No. 691,562, filed June 1, 1976, of William J. Killam for "Aircraft Toilet Drain Plug" also assigned to the assignee of the present application.

Although the system disclosed in the Lynch U.S. Pat. No. 3,010,694 has proved highly successful, problems can arise if a forgetful or lazy ground cart operator fails to re-install a drain plug which he removed for after-flight servicing, prior to the next flight. For example, such an operator may leave the removed drain plug on the setting tool of the Y-drain coupling and forget to replace it in the outlet tube. When he commences to service the next aircraft, he will find that his setting tool cannot be engaged with the drain plug at which point he will discover the presence of the drain plug left behind from the previous aircraft. Because the existence of a surplus drain plug is a tell-tale that the preceding aircraft has been improperly cleared for flight without a drain plug, which is a violation of operating procedures for which penalties can be imposed by airport and airline authorities, a ground cart operator having a surplus drain plug will often try to conceal the fact by disposing of it in the trash. This is not an infrequent or minor problem, some airlines are presently suffering losses of drain plugs, primarily due to this cause, costing thousands of dollars annually.

In addition to the foregoing plug loss problem, safety and health problems can also arise with respect to any aircraft that has been improperly returned to the flight line without an installed drain plug. If there is leakage of a significant quantity of waste down the outlet tube during flight, the outlet cover is unlikely to provide a sufficiently substantial seal to prevent escape of toilet fluids to the exterior of the fuselage and such escaped toilet fluids can cause corrosion problems and even more serious potential aircraft safety problems. Even if the leakage is insufficient to displace the cover, but merely accumulates upstream of it, the presence of an accumulated head of waste in the outlet tube can be extremely upleasant for the unsuspecting ground cart operator at the next airport when he removes the drain nipple cover during after-flight servicing.

SUMMARY OF THE INVENTION

The present invention provides a toilet drain assembly which is intended to obviate the foregoing problems, arising from a forgetful or lazy operator who fails to reinstall a drain plug in an aircraft after it has been serviced, by preventing the aircraft from being returned to flight-ready condition unless a drain plug has been installed. It achieves this result by preventing the aircraft access panel from being closed in the absence of an installed drain plug so that the ground truck operator will be forced to install a drain plug before he can close the access panel. Even if he should persist in his failure to do so, the access panel will remain open and be noticed by others during the pre-flight check so that the error can be corrected at that time.

In more detail, the assembly includes a cover which fits over the open end of the drain nipple and is provided with a handle mounted for limited motion between an extended position and a depressed position. In its extended position, the handle obstructs the access opening to prevent closure of the aircraft access panel. An interlock device responsive to the presence of the drain plug in the nipple is connected with the handle and locks the handle against movement from the extended to the depressed condition when the drain plug is not present in the nipple. Thus, if there is no drain plug installed, the access panel cannot be closed and the aircraft cannot be placed in flight-ready condition.

The toilet drain assembly thus minimizes the possibility that an aircraft can be flown without a drain plug thereby reducing the safety and health hazards associated with operating the aircraft without one. In addition, the ground cart operator is less likely to end up with a surplus drain plug which he may be tempted to throw away because, if he forgets to reinstall a drain plug after servicing the aircraft from which it came, he will be reminded of his omission when he finds that he is unable to close the aircraft access panel.

The toilet drain assembly includes other significant features which contribute towards the foregoing objectives, intended to prevent the operator from deliberately attempting to circumvent the operation of the assembly in such a way as to enable the access panel to be closed without a drain plug installed. For example, the cover is hinged to mounting structure for the drain nipple but, for it to be secured in the closed position extending across the open end of the nipple, portions of the handle must be engaged with mating portions fixedly secured to the drain plug. If the drain plug is not present, the cover will hinge downwardly under its own weight and will not be positioned across the end of the drain nipple.

A further advantage is that if the drain plug has been improperly installed, for example, not fully engaged with the recessed portions of the nipple but is misaligned relative to the axis of the tube, a condition in which leakage might escape past it in flight, the cover cannot be closed, so that the operator will be required to correctly install the drain plug before proceeding.

Further, the assembly is intended to be secured by the application of hand pressure applied initially in an inward direction to the handle to move the cover into position against the nipple followed by a turning motion to move the handle to the depressed position and lock it to the drain plug. If there is no drain plug in position, the handle will continue turning without restraint, thereby immediately advising the operator that he has not replaced the drain plug.

The handle includes a hollow shaft which extends slidably through the cover. An outer biasing spring biases the handle from the depressed to extended condition. A tubular lock control member is mounted within the shaft for limited axial motion relative thereto between extended and retracted positions and is biased to the extended position by an internal spring. Two pairs of locking balls carried by the shaft are maintained in the locking position, by the lock control member when it is in its extended position relative to the shaft contacting the cover to lock the handle in its extended position. On closing of the cover the lock control member is moved into initial contact with the drain plug and subsequent inward movement of the handle causes relative closing between the shaft and the lock control member which releases the locking balls to free the handle for movement to its depressed condition. It will be appreciated that the operator would not be able to compress both springs to their compressed condition and maintain both the handle and the lock control member in their depressed positions without having a drain plug installed in the nipple. Even if the operator should do so, e.g., by applying both hands to opposite sides of the cover, he would be unable to maintain the handle in the depressed position the moment he attempts to install the cover and must remove his hands from the cover.

A further feature of the invention resides in the provision of engaging portions on the handle and the drain plug for holding the handle in its depressed position. The engaging portions include a housing secured to the base plate of the drain plug projecting towards the open end of the nipple. The housing is provided with an axially and radially extending cam slot which receives a pin projecting from one side of the handle on the inner side of the cover. Turning the handle to advance the pin along the cam slot moves the handle axially to the depressed position and, at the conclusion of the motion, brings the pin into a pocket at the end of the cam slot. The pocket is axially relieved relative to the adjacent portions of the cam slot and the pin is biased axially outwardly into the pocket by the compression of an internal biasing spring, thus retaining the pin against reverse motion along the cam slot and holding the handle in its depressed condition. At the same time, the cover is held securely in its position against the drain nipple.

The foregoing, as well as other advantages of a toilet drain assembly according to the invention, are discussed more fully in the detailed description which follows. Although the invention is described with particular reference to an aircraft toilet drain system, it will be appreciated that the principles and the structure described are equally applicable to other liquid handling installations not restricted to an aviation environment. For example, such systems may be used in unloading liquid tank cars, fluid reservoirs, liquid storage tanks and other similar liquid handling installations.

BRIEF DESCRIPTION OF THE DRAWINGS

A toilet drain assembly according to one preferred embodiment of the invention is illustrated in the accompanying drawings in which:

FIG. 3 is a cross-sectional side view of the toilet drain assembly shown in FIG. 2 but in a final, fully closed condition with the handle in a depressed condition in which it does not prevent the access panel from closing; and FIG. 4 is a cross-sectional side view of the toilet drain assembly in a preliminary stage of closure preceding the intermediate stage shown in FIG. 1 and without an installed drain plug.

DETAILED DESCRIPTION

Figure 1:
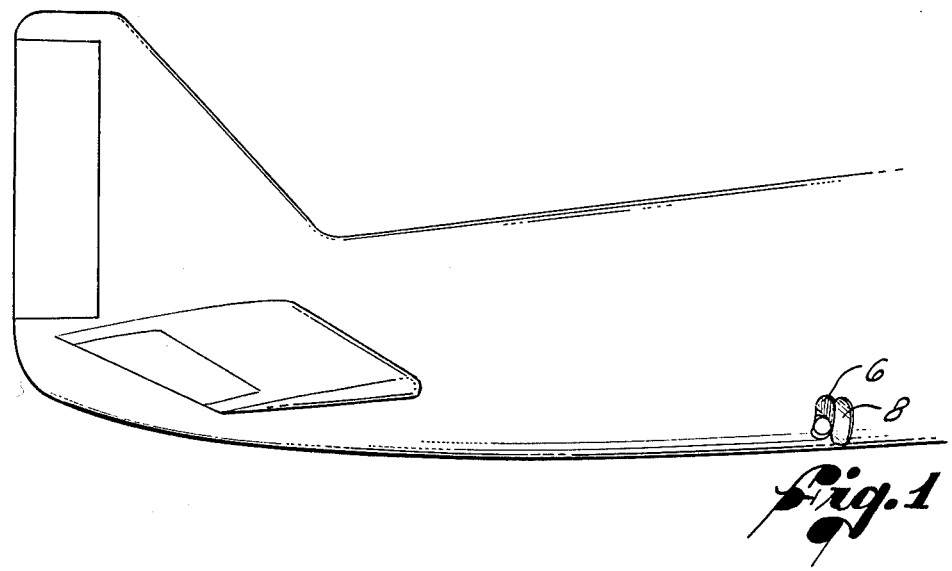
FIG. 1 is a perspective view of a portion of an aircraft fitted with a toilet drain assembly according to the invention, having an access opening in the aircraft for access to the assembly and an access panel for closing the access opening.

A toilet drain assembly according to the invention is mounted within an aircraft, shown for exemplification in FIG. 1, adjacent an access opening 6 in the aircraft fuselage which can be closed in flight by an access panel 8. The toilet drain assembly includes an annular nipple 10 connected by mounting structure generally designated 12 to adjacent portions of the aircraft structure, shown in chain-dotted lines in FIG. 2, with the open end of the nipple facing toward and spaced from the access opening 6. At its upstream end, the nipple 10 is fixedly secured to an outlet tube 14 connected to the outlet from the waste valve of the aircraft toilet holding tank (not shown).

To trap any leakage of liquid out of the holding tank during flight, an expandable drain plug 20 is installed in the nipple extending across the lower end of the outlet tube 14 in sealing relation. The drain plug 20 includes a base plate 22 spaced from and parallel to a mounting plate 24 underlying the portion of the plug, having retractable dogs 26 movably mounted between the base plate and the lower wall. During installation of the drain plug, it is inserted into the nipple on a setting tool in a collapsed condition after which the dogs 26 are moved outwardly by manipulation of the setting tool to engage a recessed locking region of the nipple, generally designated 30, adjacent its junction with the outlet tube, to lock the drain plug to the nipple against axial and rotational displacement at a predetermined inward spacing from the end of the outlet nipple. Subsequent further manipulation of the setting tool causes the expandable portion of the drain plug to be expanded into sealing contact with the walls of the outlet tube. In the preferred embodiment of the invention, the foregoing parts of the drain plug and the engaging portions on the drain nipple are as disclosed in the aforesaid Lynch U.S. Pat. No. 3,010,694, pertinent portions of the disclosure of which are incorporated herein by reference. An alternative construction of the drain plug utilizing three dogs to engage the nipple, instead of two, is disclosed in the aforesaid application of William Killam, Ser. No. 691,562, filed July 1, 1976, the pertinent portions of which are also incorporated herein by reference.

The present invention is intended to insure that, after the holding tank has been drained and flushed, the aircraft cannot be put back into flight-ready condition until the drain plug has been installed. The structure by which this result is achieved (FIG. 2) includes a circular cover 32 which, in a closed position, extends across and closes the open end of the nipple 10. The cover has a reversely bent peripheral lip 34 defining a U-shaped channel in which is mounted a compressible circular sealing ring 35 which seats upon the free end of the nipple 10 in the closed position. The cover 32 carries a handle 36 projecting through the center of the cover and mounted for limited axial motion relative thereto between an extended position (FIG. 2) in which its axially outer end is spaced relatively away from the cover and a depressed position (FIG. 3) spaced relatively closer to the cover.

When the handle 36 is in the extended position it sufficiently obstructs the access opening 6, even when the cover 32 is in position on the drain nipple (FIG. 2), to prevent closure of the aircraft access panel 8. Locking structure carried by the handle, which includes locking balls 37 and a lock control member 38 movable axially relative to the handle, cooperates with the drain plug, if it has been installed, to enable the handle to be moved to the depressed condition shown in FIG. 3 in which the access panel is unobstructed and can be closed. In the absence of a drain plug, however, the locking structure locks the handle in its extended position so that the access panel cannot be closed and the aircraft cannot be put into flight-ready condition. To ensure that the handle always occupies the extended position whenever it is not engaged with an installed drain plug, an outer biasing spring 40 is mounted between the cover 32 and the handle 36 to move it to the extended position.

It will be appreciated that the foregoing structure substantially eliminates the possibility that an aircraft may be flown without a drain plug installed. In the first instance, the ground cart operator will be reminded, when he is unable to move the handle to the depressed position, that he has omitted a drain plug in the nipple. Even if he should leave without remedying the omission, the unclosed access panel would be detected by others during pre-flight checks, so that a drain plug could be installed.

In another significant aspect of the invention, engaging structure 42 is provided on the drain plug itself to engage the handle 36 in the course of its movement to the depressed position and thereafter hold it in the depressed position until the handle is selectively released later. Such engaging structure also ensures that the cover 32 is simultaneously held in its closed position on the end of the drain nipple 10. Thus, without a drain plug in position, not only will the ground cart operator be unable to depress the handle to its depressed condition, but, further, he will not even be able to retain the cover on the end of the drain nipple. As a result, he will be forced to install a drain plug if he intends to complete his servicing function and return the aircraft to flight-ready condition.

Further, to prevent a willful ground cart operator from closing the access panel when a drain plug has not been installed by the expedient of completely removing the cover 32 and disposing of it, the cover is permanently connected to the mounting structure 12 by a slotted hinge 44. As a result, such an operator would be unable to move the cover and handle to any position in which closing of the access panel 8 could occur, as can be seen from FIGS. 2 and 4.

Figure 2:
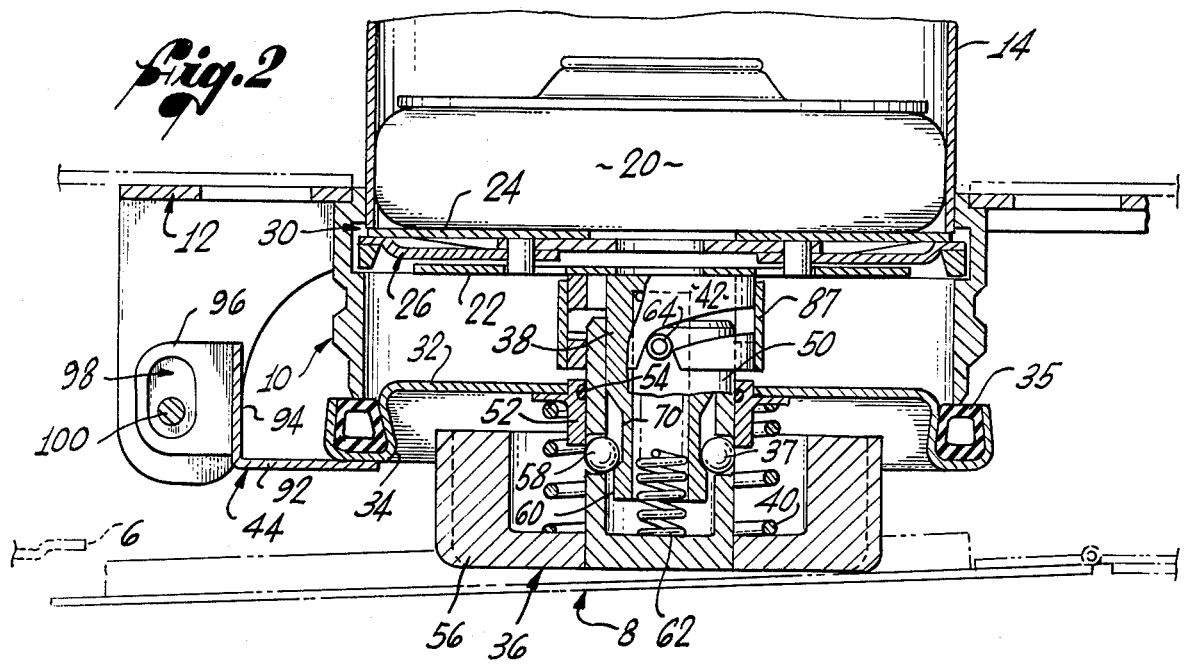
FIG. 2 is a cross-sectional side view of the toilet drain assembly in an intermediate stage of closure, with a handle, forming a part of the invention, still in an extended condition in which it obstructs the access opening preventing closure of the access panel.

In more detail, the handle 36 includes a cylindrical shaft 50 mounted for axial sliding motion in an annular support sleeve 52 which is fixedly secured to, and extends through, the central region of the cover 32. An O-ring 54, mounted in a groove in the support sleeve 52, seals against the surface of the shaft 50 to prevent leakage of liquid through the support sleeve. The handle 36 also includes an annular knob or cap 56 fixedly secured to the shaft 50 adjacent its outer end and having a recessed, inwardly facing central region receiving the previously-mentioned outer biasing spring 40. It is the axially outer edge of the knob 56 which is contacted by the access panel 8 when the handle 35 is in its extended position, to prevent the access panel from closing (FIG. 2). The peripheral edge of the knob 56 is milled or grooved to facilitate being grasped by the operator's hand and rotated, as described hereinafter, during the closing process.

The locking balls 37 for locking the handle in its extended position are mounted in diametrically opposed holes 58 extending through the wall of the shaft 50. The lock control member 38 comprises an inner cylinder mounted for axial sliding motion within the shaft 50, extending outwardly through the open end thereof, and has a first cam region 60 adjacent its opposite end which is of sufficient diameter to contact the locking balls and hold them radially outwardly in a locking position shown in FIG. 4. In the locking position, the holes 58 are sufficiently overlapped by the axially outer end of the support sleeve 52 to prevent the balls 37 from moving completely out of the holes but are projected sufficiently far outwardly by the first cam region 60 to contact the support sleeve 52 and lock the shaft 50 against inward movement.

To bias the control member to an extreme extended position relative to the handle in which the first cam region 60 is located opposite the holes 58 to hold the balls 37 in the locking position, an inner biasing spring 62 is mounted within the control member 38 and the shaft 50 contacting their closed ends. The inner biasing spring 62 is prevented from pushing the lock control member 38 outwardly beyond the extended position by the inner ends of two radial pins 64 pressfitted into two peripherally spaced openings through the wall of shaft 50, positioned on the axially inner side of the cover. The inner end of each pin 64 projects into an associated axial slot 66 (FIG. 3) along the outer surface of the lock control member 38. Each slot 66 terminates in a shoulder 68 which abuts the associated pin 64 in the extended position to prevent further extending movement of the lock control member beyond the extreme extended position.

Release of the locking balls occurs after the lock control member 38 has been moved into contact with the base plate 22 of the installed drain plug. Further axially inward motion of the handle causes relative closing motion between the lock control member 38 and the shaft 50. As a result of such closing motion, a recessed second cam region 70 on the lock control member 38, axially adjacent the first cam region 60 but of reduced outside diameter relative thereto, is moved opposite the holes 58 for the locking balls 37 (FIG. 2). The locking balls can move inwardly into the second cam region thereby freeing the handle for subsequent motion to its depressed position. An axially and radially sloped shoulder 72 is provided between the first and second cam regions 60 and 70 to enable smooth transitional movement of the locking balls between the locking and released positions upon axial motion of the locking control member.

If the operator has omitted to install the drain plug, relative closing motion between the lock control member 38 and the shaft 50 will not occur and the handle will remain locked in its extended condition preventing closure of the access panel of the aircraft. Such fact will be immediately apparent to the ground cart operator and he should thus be reminded to install the drain plug.

Subsequent motion of the handle from the initial position shown in FIG. 2, in which the locking balls have only just released, to the position in which the handle is in its depressed position, is effected by engagement between the outer end of the pin 64 and the structure 42 on the drain plug. Such structure also ensures that the handle is thereafter held in the depressed position until selectively released. The structure 42 comprises an annular housing fixedly connected to, and concentric with, the base plate 22 of the drain plug extending axially outwardly therefrom and is of sufficiently wide internal diameter to permit the setting tool to pass through without interference to perform its functions of connecting and disconnecting the drain plug to the nipple and of expanding and releasing the expandable portion of the plug. Two identical cam slots 82 (FIG. 2a) extend through the wall of the housing. Each cam slot, at its axially outer extremity, has a generally V-shaped entrance opening 84 from which the slot extends axially inwardly in a peripheral curve to a closed end comprising a retaining pocket 86.

During connection of the cover to the nipple, after sufficient closing motion has taken place between the lock control member 38 and the shaft 50 to release the locking balls 37 in the manner previously described, further inward motion of the handle brings the pins 64 into contact with the outer peripheral edge of the housing 42, thereupon temporarily terminating inward motion. At that time, the operator commences to turn the knob 56 by hand in a clockwise direction until the pins 64 enters the openings 84 to the cam slots permitting resumed inward motion. Continued clockwise turning advances the pins 64, which act as a cam followers, along the curved portions of the cam slots thereby advancing the handle inwardly towards its depressed position which it finally reaches when the pins 64 enters the cam pockets 86.

Figure 2A:
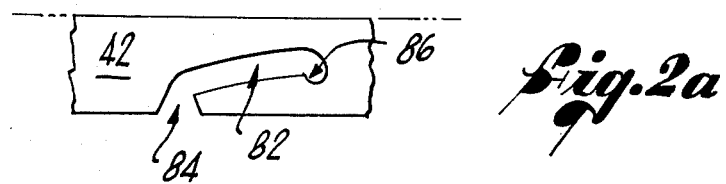
FIG. 2a is an extended view of a cam slot forming a part of the invention.

It will be appreciated that during this motion, the inner locking spring 62 is becoming further compressed and exerts a biasing force on the pins 64 in an axially outward direction. Each cam pocket 86, as best seen in FIG. 2a is relieved in an axially outward direction relative to the immediately adjacent portions of the cam slot 82 so that as the pin 64 enters the cam pocket, the biasing force exerted by the spring 62 snaps the pin into the cam pocket and traps it therein. As a result, when the operator removes his hand from the handle, the pins 64 remains trapped in the pockets instead of returning along the cam slots and the handle is held in the depressed condition. When it is desired to release the movable cover, the handle is grasped and pressed inward sufficiently to enable the pins 64 to clear the cam pockets 86 and move back into the curved portion of the cam slot. Thereafter, anti-clockwise rotation of the handle returns it to the extended position and separates the pins 64 from the housing 42 so that the cover can be removed. Additionally, the outer biasing spring 40, acting between the movable member and the cover 32 holds the cover securely in position on the end of the drain nipple with the seal 36 thereby biased against the edge of the nipple to maintain a tight seal.

Although, in the preferred embodiment, the cam slot is on the member secured to the drain plug and the cam follower is on the handle, it will readily be appreciated that the foregoing positions of the cam slots and cam followers could readily be reversed.

In order to prevent each cam follower from bending or distorting the portions of the housing adjacent the entrance 84 to the associated cam slot, a supporting sleeve 87 is secured around the exterior of the housing, by brazing or the like, to lend rigidity and support the housing wall in the regions thereof adjacent the cam slots. It will be understood that the lateral extent of each pin 64 is such that it clears the inner surface of the outer sleeve 87 without interference.

The previously mentioned hinge 44 (FIG. 3) is fixedly secured to the lip 34 of the cover 32 and includes a radial portion 92 extending radially outwardly from the cover. Extending inwardly from the outer end of the radial portion 92, is an axial portion 94 which supports two spaced, parallel, axially and laterally extending tabs 96. The tabs 96 are provided with two aligned, axially elongated slots 98 which loosely receive a bearing pin 100 supported at its opposite ends by adjacent portions of the mounting structure 12 for the drain nipple. The hinge 44 can be rotated about the pin 100 from its closed position of the cover extending across the end of the drain nipple, (FIGS. 2 and 3) through 90° to an open position spaced from and extending parallel to the axis of the nipple, in which unobstructed access can be had to the drain nipple through the access opening 6. The axial length of the slot 98 is sufficient to enable the locking control member 38 to be moved axially in and out of the housing 80 without interference, by axial movement of the cover. In addition the radially oversized nature of the hole 98 relative to the bearing pin 100 enables the cover 32 to be positioned concentrically on the drain nipple. Because of the positive connection between the cover and the nipple-mounting structure provided at all times by the hinge 44, it is not possible for the ground operator to remove the cover as a way to avoid the obstructing effect of the extended handle if he has failed to install a drain plug in the outlet tube.

Although the invention has been described with reference to one preferred embodiment, it will be appreciated that many additions, deletions, substitutions and modifications may be made without departing from the invention as defined by the appended claims.

We claim:

1. A toilet drain assembly for an aircraft equipped with a toilet waste holding tank and an outlet tube leading from the holding tank to a portion of the aircraft provided with an access opening and a movable access panel for opening and closing the access opening, the toilet drain assembly comprising, an annular nipple connected to the outlet tube, having an open end;

mounting structure for connecting said nipple to the aircraft with said open end facing towards the access opening spaced in an axially inward direction therefrom;

a drain plug removably connected to said nipple extending thereacross spaced inwardly from said open end;

a cover removably positioned across the open end of said nipple in contact therewith; and means connected to said cover responsive to the presence or absence of said drain plug in said nipple for preventing the access panel from closing the access opening when said drain plug is not present in said nipple and for allowing the access panel to close when said drain plug is present in said nipple.

2. A toilet drain assembly for an aircraft equipped with a toilet waste holding tank and an outlet tube leading from the holding tank to a portion of the aircraft provided with an access opening and a movable access panel for opening and closing the access opening, the toilet drain assembly comprising, an annular nipple connected to the outlet tube, having an open end;

mounting structure for connecting said nipple to the aircraft with said open end facing towards the access opening spaced in an axially inward direction therefrom;

a drain plug removably connected to said nipple extending thereacross spaced inwardly from said open end;

a cover removably positioned across the open end of said nipple in contact therewith; and panel contacting means connected to said handle responsive to the presence or absence of said drain plug in said nipple for contacting the access panel to prevent it from closing the access opening when said drain plug is not present in said nipple and for allowing the access panel to close when said drain plug is present in said nipple; and securing means connected to said drain plug for releasably engaging said cover when said drain plug is connected to said nipple to secure said cover in position on the end of said nipple.

3. A toilet drain assembly for an aircraft equipped with a toilet waste holding tank and an outlet tube leading from the holding tank to a portion of the aircraft provided with an access opening and a movable access panel for opening and closing the access opening, the toilet drain assembly comprising, an annular nipple connected to the outlet tube, having an open end;

mounting structure for connecting said nipple to the aircraft with said open end facing toward the access opening spaced in an axially inward direction therefrom;

a drain plug removably connected to said nipple extending thereacross spaced inwardly from said open end;

a cover removably positioned across the open end of said nipple in contact therewith;

a handle movably connected to said cover projecting in an axially outward direction therefrom towards the access opening, said handle mounted for limited motion relative to said cover between extended and depressed positions, said handle in the extended position preventing the access panel from closing the access opening;

locking means connected to said handle responsive to the presence or absence of said drain plug in said nipple for locking said handle in the extended position when said drain plug is not present in said nipple and for releasing said handle for movement to the depressed position when said drain plug is present in said nipple; and engaging means secured to said drain plug releasably engaging said handle to said drain plug during movement of said handle to its depressed condition for thereafter maintaining said handle in its depressed position and for holding the cover in position on the end of said nipple.

4. A toilet drain assembly for an aircraft equipped with a toilet waste holding tank and an outlet tube leading from the holding tank to a portion of the aircraft provided with an access opening and a movable access panel for opening and closing the access opening, the toilet drain assembly comprising, an annular nipple connected to the outlet tube, having an open end;

mounting structure for connecting said nipple to the aircraft with said open end facing towards the access opening spaced in an axially inward direction therefrom;

a drain plug removably connected to said nipple extending thereacross spaced inwardly from said open end;

a cover removably positioned across the open end of said nipple in contact therewith;

a handle movably connected to said cover projecting in an axially outward direction therefrom towards the access opening, said handle mounted for limited motion relative to said cover between extended and depressed positions, said handle in the extended position preventing the access panel from closing the access opening; and locking means connected to said handle responsive to the presence or absence of said drain plug in said nipple for locking said handle in the extended position when said drain plug is not present in said nipple and for releasing said handle for movement to the depressed position when said drain plug is present in said nipple.

5. A toilet drain assembly as defined in claim 4 wherein said locking means includes, at least one locking member movably connected to said handle for limited motion between a locking position and a released position, said locking member in the locking position engaging said cover with said handle to prevent movement thereof to its depressed position, said locking member in the released position being disengaged from said cover to free said handle for motion; and lock control means connected to said locking member contacting said drain plug for freeing said locking member for movement to its released position when said drain plug is present in said nipple, said lock control means preventing movement of said locking member to the released position when said drain plug is not present in said nipple.

6. A toilet drain assembly as defined in claim 5 wherein said lock control means includes, a control member connected to said handle for limited axial motion relative thereto having one end movable into contact with said drain plug, said control member adjacent an opposite end thereof contacting said locking member to control motion thereof between the locking and released positions; and biasing means acting on said control member to extend it relatively to said handle to an extended position in which said control member maintains said locking member in its locking position, axially inward movement of said handle moving said control member in a closing direction relative to said handle when said control member is in contact with said drain plug causing said control member to free said locking member for movement to its released position.

7. A toilet drain assembly as defined in claim 6 wherein, said handle includes a shaft mounted in and extending slidably through said cover for axial motion relative thereto, said shaft having, mounting means for mounting said locking member for radial movement relative to said shaft between said locking and released positions;

and wherein, said control member is mounted on said shaft for axial sliding motion relative thereto, said one end of said control member projecting beyond the axially inner end of the said shaft into contact with said drain plug, said control member adjacent its opposite end having, a first cam region which is axially aligned with and contacts said locking member when said control member is in the extended position relative to said handle to support said locking member in its locking position; and a second cam region spaced axially, and recessed radially, from said first cam region, said second cam region being moved into axial alignment with said locking member upon a predetermined extent of closing motion of said control member from its extended position relative to said handle thereby freeing said locking member for movement to the released position.

8. A toilet drain assembly as defined in claim 7 wherein said shaft and said control member comprise concentric outer and inner cylinders, respectively, mounted in axially sliding relation and wherein said locking member comprises at least one locking ball mounted in a lateral opening in said outer cylinder for motion between the locking position and the released position.

9. A toilet drain assembly as defined in claim 4 further including, biasing means connected between said cover and said handle for urging said handle from the depressed to the extended position.

10. A toilet drain assembly as defined in claim 4 further including:

means connecting said cover to said mounting structure for motion of said cover from its position against and closing the open end of said nipple to a separated position in which said cover is spaced away from said nipple and projects outwardly through the access opening.

11. A toilet drain assembly as defined in claim 8 wherein said means for connecting said cover includes, a slotted hinge connected to said mounting structure and said cover enabling said cover to be rotated from the separated position to an intermediate position in which said cover is parallel to and spaced from the open end of said nipple and thereafter moved axially from the intermediate position into engagement with the end of said nipple extending thereacross.

12. A toilet drain assembly for an aircraft equipped with a toilet waste holding tank and an outlet tube leading from the holding tank to a portion of the aircraft provided with an access opening and a movable access panel for opening and closing the access opening, the toilet drain assembly comprising, an annular nipple connected to the outlet tube, having an open end;

mounting structure for connecting said nipple to the aircraft with said open end facing toward the access opening spaced in an axially inward direction therefrom;

a drain plug removably connected to said nipple extending thereacross spaced inwardly from said open end;

a cover removably positioned across the open end of said nipple in contact therewith; and mutually engaging first and second securing means connected to said drain plug and said cover, respectively, for releasably securing said cover in position on the end of said nipple.

13. A toilet drain assembly as defined in claim 12 wherein one of said securing means comprises a male engaging member and the other of said securing means comprises a female engaging member for releasably engaging said male member when said cover is positioned on the end of said nipple to thereby maintain said cover in such position.

14. A toilet drain assembly as defined in claim 13 wherein, said female engaging member includes, a housing fixedly connected to the associated one of said cover and said drain plug, said housing having an open ended slot therein communicating with a retainer pocket, said male engaging member entering said slot and becoming releasably trapped within said retainer pocket to secure said cover to said nipple, and biasing means for yieldably resisting release of said male engaging member from said retainer pocket.

15. A toilet drain assembly as defined in claim 14 wherein, said female engaging member comprises a generally tubular base fixedly secured to said drain plug, said slot extending in axial and peripheral directions with the open end thereof facing towards said cover;

and wherein said male member comprises, a shaft connected to said cover slidable axially into said base; and a pin secured to said shaft positioned to enter said slot during motion of said shaft into said base and move into said retainer pocket.

16. A drain plug for use in an aircraft toilet system of the type including an outlet tube terminating in a drain nipple having internal recessed portions for engagement by the drain plug, the nipple being provided with a cover removably positioned on the end of the nipple extending thereacross, the cover being provided with an engagement member, the drain plug comprising, a base plate, gripping means secured to said base plate selectively movable into mechanical grippping engagement with the recessed portions of the nipple to fixedly secure said base plate to the nipple at a pre-determined inward spacing from the open end thereof;

an expandable sealing member connected to said base plate for selective expansion into sealing engagement with the outlet tube to prevent leakage therefrom; and securing means fixedly secured to said base plate projecting axially therefrom on an opposite side from said sealing member for mating engagement with the engagement member on the cover to secure the cover in position on the end of the nipple.

17. A drain plug as defined in claim 16 for use with a cover wherein the engaging member on the cover is a male engaging member and wherein, said securing means includes a housing fixedly connected to said base plate, said housing having a slot therein having an open end facing towards the said cover and a retainer pocket, the male engaging member connected with cover entering said slot and becoming releasably trapped within said retainer pocket to secure the cover to the nipple.

18. A drain plug for use in an aircraft toilet system having an outlet tube and a drain nipple connected to the outlet tube, the drain nipple having internally recessed portions at a pre-determined location, the drain plug comprising, a base plate, releasable means mounted on said base plate for fixedly engaging said base plate with the recessed portions of the nipple;

an expandable sealing member mounted on said base plate for selective expansion into sealing contact with the outlet tube to prevent leakage therefrom;

a generally tubular housing fixedly secured to said base plate on the opposite side from said sealing member projecting outwardly; and at least one axially and peripherally extending slot extending through said housing, said slot having an open end facing towards the open end of the nipple and a closed end spaced axially inwardly therefrom, said slot at its axially inward end being relieved in an axially outward direction to define a pocket.

19. A liquid handling assembly for a liquid handling installation having a tube leading to a portion of the installation provided with an access opening and a movable access panel for opening and closing the access opening, the liquid handling assembly comprising, an annular nipple connected to the tube, having an open end;

mounting structure for connecting said nipple to the installation with said open end facing towards the access opening spaced in an axially inward direction therefrom;

a plug removably connected to said nipple extending thereacross spaced inwardly from said open end;

a cover removably positioned across the open end of said nipple in contact therewith; and means connected to said handle responsive to the presence or absence of said plug in said nipple for preventing the access panel from closing the access opening when said plug is not present in said nipple and for allowing the access panel to close when said plug is present in said nipple.

20. A liquid handling assembly for a liquid handling installation having a tube leading to a portion of the installation provided with an access opening and a movable access panel for opening and closing the access opening, the liquid handling assembly comprising, an annular nipple connected to the outlet tube, having an open end;

mounting structure for connecting said nipple to the installation with said open end facing toward the access opening spaced in an axially inward direction therefrom;

a plug removably connected to said nipple extending thereacross spaced inwardly from said open end;

a cover removably positioned across the open end of said nipple in contact therewith; and mutually engaging first and second securing means connected to said plug and said cover, respectively, for releasably securing said cover in position on the end of said nipple.

21. A liquid handling assembly for a liquid handling installation having a tube leading to a portion of the installation provided with an access opening and a movable access panel for opening and closing the access opening, the liquid handling assembly comprising, an annular nipple connected to the outlet tube, having an open end;

mounting structure for connecting said nipple to the installation with said open end facing towards the access opening spaced in an axially inward direction therefrom;

a plug removably connected to said nipple extending thereacross spaced inwardly from said open end;

a cover removably positioned across the open end of said nipple in contact therewith; and panel contacting means connected to said handle responsive to the presence or absence of said plug in said nipple for contacting the access panel to prevent it from closing the access opening when said plug is not present in said nipple and for allowing the access panel to close when said plug is present in said nipple; and securing means connected to said plug for releasably engaging said cover when said plug is connected to said nipple to secure said cover in position on the end of said nipple.

22. A liquid handling assembly for a liquid handling installation having a tube leading to a portion of the installation provided with an access opening and a movable access panel for opening and closing the access opening, the liquid handling assembly comprising, an annular nipple connected to the tube, having an open end;

mounting structure for connecting said nipple to the installation with said open end facing toward the access opening spaced in an axially inward direction therefrom;

a plug removably connected to said nipple extending thereacross spaced inwardly from said open end;

a cover removably positioned across the open end of said nipple in contact therewith;

a handle movably connected to said cover projecting in an axially outward direction therefrom towards the access opening, said handle mounted for limited motion relative to said cover between extended and depressed positions, said handle in the extended position preventing the access panel from closing the access opening;

locking means connected to said handle responsive to the presence or absence of said plug in said nipple for locking said handle in the extended position when said plug is not present in said nipple and for releasing said handle for movement to the depressed position when said plug is present in said nipple; and engaging means secured to said plug releasably engaging said handle to said plug during movement of said handle to its depressed condition for thereafter maintaining said handle in its depressed position and for holding the cover in position on the end of said nipple.

23. A liquid handling assembly for a liquid handling installation having a tube leading to a portion of the installation provided with an access opening and a movable access panel for opening and closing the access opening, the liquid handling assembly comprising, an annular nipple connected to the outlet tube, having an open end;

mounting structure for connecting said nipple to the installation with said open end facing towards the access opening spaced in an axially inward direction therefrom;

a plug removably connected to said nipple extending thereacross spaced inwardly from said open end;

a cover removably positioned across the open end of said nipple in contact therewith;

a handle movably connected to said cover projecting in an axially outward direction therefrom towards the access opening, said handle mounted for limited motion relative to said cover between extended and depressed positions, said handle in the extended position preventing the access panel from closing the access opening; and locking means connected to said handle responsive to the presence or absence of said plug in said nipple for locking said handle in the extended position when said plug is not present in said nipple and for releasing said handle for movement to the depressed position when said plug is present in said nipple.

24. A toilet drain assembly for an aircraft equipped with a toilet waste holding tank and an outlet tube leading from the holding tank to a portion of the aircraft provided with an access opening and a movable access panel for opening and closing the access opening, the toilet drain assembly comprising, an annular nipple connected to the outlet tube, having an open end;

mounting structure for connecting said nipple to the aircraft with said open end facing towards the access opening spaced in an axially inward direction therefrom;

a drain plug removably connected to said nipple extending thereacross spaced inwardly from said open end;

a cover removably positioned across the open end of said nipple in contact therewith in a closed position of said cover;

first means connected to said handle responsive to the presence or absence of said drain plug in said nipple for preventing the access panel from closing the access opening when said drain plug is not present in said nipple and for allowing the access panel to close when said drain plug is present in said nipple; and second means permanently connecting said cover to said mounting structure for movement from the closed position to an open position separated from said nipple, said second means locating said cover and said first means, in the open position and in any intermediate position between the open position and the closed position, in obstructing relation to the access panel to prevent it from closing the access panel.

* * * * *